Figure 1:
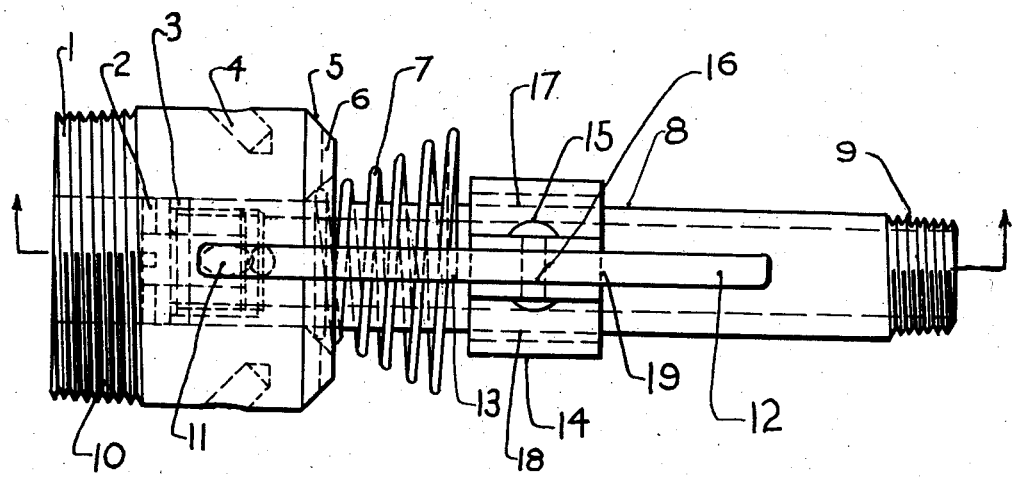

Jan. 24, 1939.   F. P. DI CESARE   2,144,834
COUPLING MACHINE
Filed June 29, 1937

INVENTOR
Fred Penfilo Di Cesare.

Patented Jan. 24, 1939

2,144,834

UNITED STATES PATENT OFFICE 2,144,834

COUPLING MACHINE

Fred Panfilo Di Cesare, Steubenville, Ohio

Application June 29, 1937, Serial No. 150,919

1 Claim. (Cl. 285—172)

This coupling shall be known as the D. C. coupling.

The invention relates to improvements in coupling machines in which the female part of this D. C. coupling is made out .10% to .20% commercial steel bar stock, or cast iron, or brass depending on where it is to be used. This invention has been primarily created for use in the lubrication leads for the bearings of the rolls in the continuous hot strip steel industry, but in a general scoop it has also been created for fluid leads in general steel mill practices, erection, and/or like industry. When these D. C. couplings are used in continuous hot strip mill as lubrication leads to the bearings of rolls, the female part of said D. C. coupling will be made out of .10% to .20% carbon content, commercial steel stock bars for the reason that when said coupling is used on these rolls they will have to take plenty of bumps, and in order to stand up under these bumps common in the steel industry, these female parts of said D. C. coupling if made out of specified stock they may be case hardened. When this coupling is to be used as a connection other than places similar to the continuous strip mill, the female part of said coupling will be made of cast iron or brass or extra heavy pipe. Thus for an air or other fluid connection that are in a secluded, guarded place, and which require frequent changes or which are of such a nature that a coupling of this type will be advantageous, the female part of said coupling will be made of brass or cast iron or extra heavy pipe. The male part of said coupling will be made out of commercial Bessemer or open hearth commercial stock pipe. The section of the male part of said coupling making contact with the female part of said coupling will be finished for a machine fit slightly past the edge of the trigger base. When packing washer and hollow slotted set screw is used on the inner end of male part of said coupling, the section of the male part of said coupling making contact with female part of said coupling and slightly past the edge of the trigger base, is either finished or unfinished for a machine fit. Thus in the best grade of these D. C. couplings the part of male and female parts of said coupling will be finished for a machine fit and packing washer in combination with a hollow slotted set screw. The trigger base will be made out of strip steel bands, cold pressed into shape, and likewise the trigger itself. The trigger base is to be tag welded on the proper point of the male part of said coupling. The packing washer used on the inner end of the female part of coupling making contact with male part of coupling is to be made out of leather or other like suitable material, and said packing washer to be held in place by a slotted hollow set screw threaded inside of the end of the female part of coupling, making contact with the male part of coupling. This slotted hollow set screw is also to act as a means of expanding the packing washer by tightening the hollow slotted set screw further into the inner threaded end of the male part of said coupling and forcing more packing material from the inner edge of packing washer to outer edge. The spring used on trigger of coupling is a tapered spiral spring, the smaller end of tapered spiral spring is to fit on the outside of the female part of coupling with a loose sliding fit. The large end of tapered spiral spring is to emerge into a straight piece which is fitted into a drilled hole on trigger and anchored. The purpose of this spring on the trigger is to keep male and female part of coupling locked to a certain tension when said coupling is in a so-called locked position. The trigger is fitted onto the trigger base with no lost side motion, and said trigger is to be held on trigger base by a small rivet. This rivet to penetrate both through drilled holes in trigger base and trigger and hammered into position. Of course, the trigger will pivot on the rivet which holds trigger in position on the trigger base. For grease-connection to bearings which are opened to the atmosphere resulting in negligible pressure at the point of the coupling, the male part of coupling making contact with female part of coupling is to be finished for a machine fit, and the female part making contact with male part is to be drilled and reamed for this machine fit, and when this is done the packing washer and hollow slotted set screw is to be omitted in said coupling machine. The object of the improvements in this coupling machine are first to provide a coupling of rugged and efficient construction which can be used in general steel mill work and construction; second, to be made in such a manner that it can be used especially well in the lubrication of bearings in the rolls of the continuous strip mill industry; third, to be made with the best machine shop practice with special emphasis on turret lathe practices; fourth, to produce a coupling of such a nature which can be used to bring fluid to many required positions where constrained connections or couplings of other nature will not do the required duty efficiently; fifth, to make a coupling which can be used efficiently from low pressures to high pressures; and sixth, finally to produce a coupling of such a rugged and efficient construction, and of such simple fundamental lines which will range from the smallest connection to the largest connections, and which the calloused hands of the steel worker and others will find a great help for many jobs which they at present do with a lot of effort, but which with the use of this coupling they can do more efficiently and easier.

Figure 2:
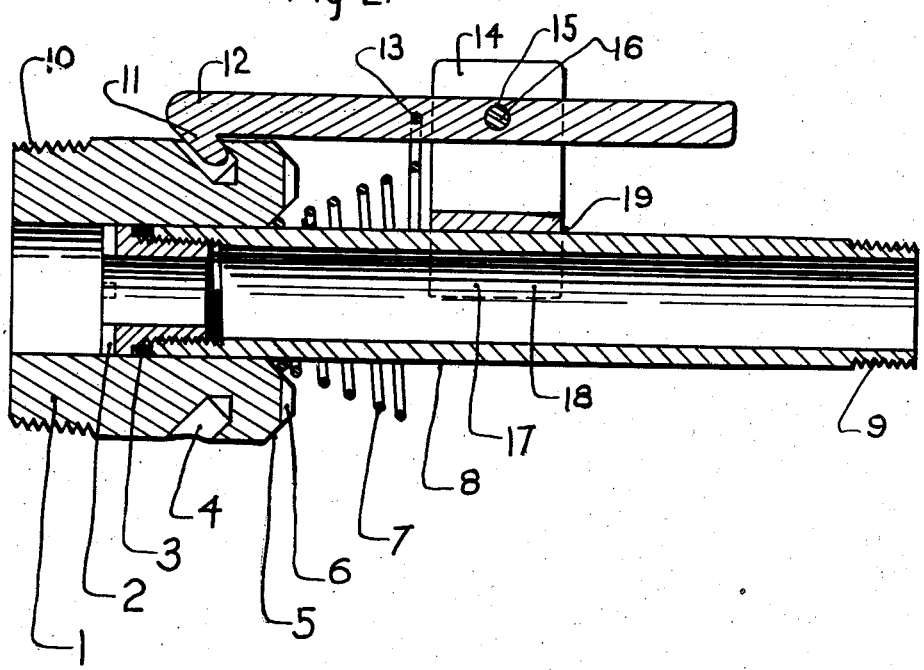

Fig. 1 is an elevation of the coupling.
Fig. 2 is a longitudinal section.

The female part of said coupling 1, is made as shown in this drawing. The D. C. coupling is made in a series of smaller and larger sizes other than the size approximately represented by this drawing. The opening of the female part of the D. C. coupling is chamfered 5, in and out at the entrance. The slope of this chamfer is 45° away from the face of opening. The female part of the D. C. coupling is made out of commercial stock steel pipe. This female part of the coupling is machined for a machine fit only from the end of the male part of said coupling, entering female part of said coupling to the trigger base. If this end of male part of coupling entering female part of coupling is not finished for a machine fit, the packing washer 3 and hollow set screw 2 are used, or for a better job both are combined. The trigger base 14, is made from strip steel bands and cold pressed and tag welded at 17, 18 and 19 onto the female part. The trigger 12 pivots on trigger base on rivet 16. Trigger point is sloped at 45° (degrees). The trigger spring 7, holds trigger with a certain tension when in locked position. No. 4 is drilled holes required on female part of coupling for trigger point 11. Both trigger point and the drilled holes are sloped at 45 away from face of female part of coupling. No. 13 is a drilled hole on trigger which holds the spring 7. Said spring is slipped over the end of male part of coupling and anchored on drilled hole 13 on trigger 12. Slot 6 on female part of coupling is to serve as a guide for trigger point 11 and slot 6 on female part of coupling 1 is also to serve as base for a tool such as a screw driver in screwing the female part of said coupling into position in constricted places where a pipe wrench cannot be used because of lack of sufficient room. No. 10 is U. S. standard pipe thread. No. 9 is U. S. standard pipe thread. No. 8 is a section of commercial steel pipe.

Beginning at the head of this detailed description I want to say that this coupling is to be made on the most efficient machine shop practices with the turret lathe of prime importance. The female part of coupling 1 is to be made out of commercial steel bar stock or cast iron or brass and size of bar to be in harmony with the size of coupling being turned out. The female part of represented D. C. coupling will be drilled and reamed centrally for a machine fit. Said female part of coupling 1, will be threaded as shown on one end with U. S. standard pipe thread. Said female part of coupling will have drilled holes 4, and four in number of a diameter equal to trigger point 11 plus a clearance and spaced at 90° (degrees) intervals, and of depth half way from outside surface to inner surface of the drilled and reamed hole. These four holes will slope towards the threaded end of female part of coupling 45° (degrees). Said holes 4, to serve as the connecting link for trigger point 11. The outer end of this D. C. female part of coupling is to be slotted 6, to a depth of $\frac{1}{16}$" and four of these slots will be required. These slots to serve as a lead for the trigger point 11, such that trigger point 11 will easily find its home in any one of the four drilled holes 4. This said female part of this D. C. coupling to be chamfered 5, in and out at the outer end. The purpose of these chamfers 5, is for the outer chamfer to serve as a slideway for trigger point 11, and for the inner chamfer to serve as a sliding guide-way for packing washer 3. We will now proceed to the male part of this D. C. coupling. No. 8 is a section of commercial steel pipe. No. 9 is U. S. standard pipe thread. No. 2 is a slotted hollow set screw screwed on the inside threads on inner end of male part of coupling 8. No. 3 is a packing washer made of leather or other like material which is placed on inner end of male part of D. C. coupling and held in place by the hollow slotted set screw 2, which screws into inside threads of the inner end of male part of coupling. Said hollow set screw 2, to be slotted for tool, such as screw driver. When packing becomes too loose due to constant use, hollow set screw 2 is tightened, forcing more packing material toward outer edge, thus giving us a tight fit. Trigger base 14, is to be made of strip steel bands, cold pressed into shape and drilled through at 16 for rivet 15. This trigger base is then welded on male part of coupling 8, at points 17, 18 and 19. Trigger 12 to be cold cut into shape and finished. Trigger point 11 is to be finished so that we will have a loose fit between trigger point 11 and drilled holes 4 which serve as a trigger point base. Trigger spring 7 is to be made of light spring steel consisting of a few spirals giving us a tapered spring. This trigger spring 7, will slide over the inner end of male part of coupling 8, and the inner part of this trigger spring will fit snugly in the inner chamfer 5, and at the same time have a free sliding action with the inner end of male part of coupling 8. The outer end of trigger spring 7 is to emerge into a straight piece of spring steel which will be anchored into drilled hole 13, of trigger 12. In actual operation such would be the manner of procedure. Female part of coupling 1 is screwed into position by use of pipe wrench or if position is hidden and does not adapt itself to the use of this pipe wrench, female part of coupling 1 will be screwed into position by the use of a screw driver which will fit into slot 6. We will assume that trigger base 14, rivet 15, and trigger spring 7 are assembled. Hollow set screw 2 and packing washer 3 will be assembled onto male part of coupling 8. Then if female part of coupling 1 is in position, male part of coupling is to be screwed into position at 9 from grease leads, oil leads, air leads or leads containing other fluids. Then holding assembled male part of coupling in hand it is led to the chamfered part 5 of female part of coupling 1. Trigger point 11 will be in slot 6 of female part of coupling 1. Assembled part of male coupling 8 will then be forced into female part of coupling 1, until trigger point 11 will snap into any one of the four trigger bases 4. Female part of coupling 1, assembled into the required position and male part of coupling 8 threaded into the fluid leads will then be in a locked position. To break this locked position of the assembled female part of coupling 1, in required position with the assembled male part of coupling 8, coming from fluid lead, the assembled male part of coupling 8 is forced still further into the female part of coupling 1 assembled into required position until trigger point 11 snaps out of sloping drilled trigger point base 4. At this point the assembled male part of coupling 8 is rotated approximately 40° (degrees) and at this stage of the cycle the male part of coupling 8 may be drawn out. This completes the working cycle of the D. C. coupling.

I claim:

A pipe and socket coupling wherein the pipe end is provided with internal threads, a flanged thimble threaded into said pipe end, and a packing disposed between the flange of the thimble and the end of the pipe, latch means pivotally mounted on the pipe and engageable with the socket to prevent separation of the pipe from the socket, and a coil spring surrounding the pipe and having one end connected to the latch, the construction and arrangement being such as to maintain the latch in operative position, the free end of said spring abutting the socket and operating to exert a withdrawing thrust between the pipe and socket when the latch is disengaged.

FRED PANFILO DI CESARE.